US011302047B2

(12) United States Patent
Doggett et al.

(10) Patent No.: US 11,302,047 B2
(45) Date of Patent: Apr. 12, 2022

(54) TECHNIQUES FOR GENERATING MEDIA CONTENT FOR STORYBOARDS

(71) Applicant: DISNEY ENTERPRISES, INC., Burbank, CA (US)

(72) Inventors: Erika Varis Doggett, Los Angeles, CA (US); Mark Arana, Agoura Hills, CA (US); Michael Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/831,666

(22) Filed: Mar. 26, 2020

(65) Prior Publication Data

US 2021/0304468 A1 Sep. 30, 2021

(51) Int. Cl.
*G06T 11/60* (2006.01)
(52) U.S. Cl.
CPC .......... *G06T 11/60* (2013.01); *G06T 2200/24* (2013.01)
(58) Field of Classification Search
None
See application file for complete search history.

(56) References Cited

U.S. PATENT DOCUMENTS

| | | | |
|---|---|---|---|
| 5,604,857 A | 2/1997 | Walmsley | |
| 8,223,152 B2 | 7/2012 | Kim | |
| 8,443,284 B2 * | 5/2013 | Lindley | G11B 27/34 715/704 |
| 8,830,243 B2 | 9/2014 | Lee et al. | |
| 9,106,812 B1 | 8/2015 | Price et al. | |
| 9,633,695 B2 * | 4/2017 | Axen | G11B 27/034 |
| 10,055,494 B1 | 8/2018 | Bordenet et al. | |
| 10,372,801 B2 | 8/2019 | Kokemohr | |
| 10,623,831 B1 | 4/2020 | Paul | |

(Continued)

FOREIGN PATENT DOCUMENTS

GB 2519312 A 4/2015

OTHER PUBLICATIONS

Non-Final Office Action received for U.S. Appl. No. 16/155,799, dated Nov. 18, 2019, 12 pages.

(Continued)

*Primary Examiner* — Motilewa Good Johnson
(74) *Attorney, Agent, or Firm* — Artegis Law Group, LLP

(57) ABSTRACT

In various embodiments, a storyboarding application generates a storyboard for a media title. In operation, the storyboarding application determines a categorization for a first portion of the media item. The storyboarding application then determines a first media item based on at least one of the categorization or a caption associated with the first portion of the media title. Subsequently, the storyboarding application modifies the first media item based on at least one of the categorization or a character associated with the caption to generate a second media item. The storyboarding application then generates a sequence of media items for the storyboard that includes the second media item. Advantageously, because the storyboarding application can automatically generate media items for storyboards based on categorizations and/or captions, the storyboarding application can reduce both the manual effort and time required to generate storyboards relative to prior art techniques.

20 Claims, 3 Drawing Sheets

(56) References Cited

U.S. PATENT DOCUMENTS

| | | | |
|---|---|---|---|
| 10,716,545 B2* | 7/2020 | Kelly | A61B 8/54 |
| 10,719,545 B2* | 7/2020 | Ananthan | H04N 21/8545 |
| 2003/0195863 A1* | 10/2003 | Marsh | G06F 16/48 |
| 2007/0147654 A1* | 6/2007 | Clatworthy | G06F 40/242 |
| | | | 382/100 |
| 2008/0007567 A1 | 1/2008 | Clatworthy et al. | |
| 2009/0024963 A1 | 1/2009 | Lindley et al. | |
| 2009/0201298 A1 | 8/2009 | Jung | |
| 2011/0102424 A1* | 5/2011 | Hibbert | G06T 11/60 |
| | | | 345/419 |
| 2012/0090000 A1* | 4/2012 | Cohen | G11B 27/034 |
| | | | 725/32 |
| 2012/0109966 A1* | 5/2012 | Liang | G06F 16/338 |
| | | | 707/740 |
| 2013/0198602 A1* | 8/2013 | Kokemohr | G06F 40/106 |
| | | | 715/233 |
| 2013/0254292 A1* | 9/2013 | Bradley | H04L 65/403 |
| | | | 709/204 |
| 2013/0305153 A1 | 11/2013 | Schwarz | |
| 2014/0019865 A1 | 1/2014 | Shah | |
| 2014/0282013 A1 | 9/2014 | Amijee | |
| 2015/0317571 A1 | 11/2015 | Maetz et al. | |
| 2015/0371423 A1 | 12/2015 | Rubin | |
| 2016/0004681 A1* | 1/2016 | Panguluri | G06F 16/345 |
| | | | 715/256 |
| 2017/0024095 A1 | 1/2017 | Glascow | |
| 2017/0048597 A1 | 2/2017 | Silverstein et al. | |
| 2017/0235848 A1* | 8/2017 | Van Dusen | G06F 30/20 |
| | | | 705/12 |
| 2018/0276004 A1 | 9/2018 | Bache et al. | |
| 2018/0356967 A1* | 12/2018 | Rasheed | G06F 3/04847 |
| 2019/0107927 A1* | 4/2019 | Schriber | G06N 5/04 |
| 2019/0138923 A1 | 5/2019 | Jacobs | |
| 2019/0155949 A1* | 5/2019 | Castaneda | G06F 16/9038 |
| 2019/0206290 A1* | 7/2019 | Haberman | H04N 7/163 |
| 2019/0222869 A1* | 7/2019 | Lasser | H04N 21/251 |
| 2021/0056376 A1* | 2/2021 | Panayiotou | G10L 13/02 |

OTHER PUBLICATIONS

Final Office Action received for U.S. Appl. No. 16/155,799, dated Mar. 19, 2020, 14 pages.

Non-Final Office Action received for U.S. Appl. No. 16/155,775, dated May 14, 2020, 30 pages.

Takahashi, "How Pixar made Monsters University, its latest technological marvel," https://venturebeat.com/2013/04/24/the-making-of-pixars-latest-technological-marvel-monsters-university/view-all/, Apr. 24, 2013, 19 pages.

European Search Report in EP Application No. 18198825, dated Jan. 16, 2019.

Non-Final Office Action received for U.S. Appl. No. 16/155,799, dated Jan. 25, 2021, 19 pages.

Final Office Action received for U.S. Appl. No. 16/155,799, dated Jul. 8, 2021, 20 pages.

Notice of Allowance received for U.S. Appl. No. 16/155,775 dated Sep. 23, 2020, 11 pages.

Notice of Allowance received for U.S. Appl. No. 16/155,775 dated Dec. 9, 2020, 12 pages.

Notice of Allowance received for U.S. Appl. No. 16/155,799, dated Oct. 29, 2021, 9 pages.

* cited by examiner

TECHNIQUES FOR GENERATING MEDIA CONTENT FOR STORYBOARDS

BACKGROUND

Field of the Various Embodiments

The various embodiments relate generally to computer science and media processing and, more specifically, to techniques for generating media content for storyboards.

Description of the Related Art

A traditional storyboard is a sequence of still images that visually conveys an idea and plan for a media title. Each image typically represents one or more shot(s) in the media title and may be annotated with information that conveys a vision for the shot(s). Examples of annotated information can include, without limitation, characters and props that are present during the shot(s), actions performed by the characters with or without props during the shot(s), camera angles for capturing the shot(s), lighting for the shot(s), dialog that is spoken during the shot(s), sound effects that are heard during the shot(s), and music played during the shot(s), to name a few. Storyboards are usually generated after the initial scripts for the relevant media titles have been written, but before production begins, to allow filmmakers and others to plan out filming or other content-generation processes and get a feel for how the finished media titles may appear once generated and displayed.

The storyboard generation process usually beings when an initial storyboard is generated by a group of storyboard artists that generate images either manually or via digital sketching software. After the initial storyboard has been generated, writers and the group of storyboard artists iteratively refine the script and storyboard in a collaborative effort to properly capture the vision and style of the filmmakers or others who are responsible for generating the finished media title.

One drawback of the above process is that storyboards can include dozens of images for each page of a script, and generating and updating each image usually requires a substantial amount of manual effort (e.g., tens, if not hundreds, of minutes). As a result, the total amount of time required to develop a storyboard for a given media title can substantially delay the production of the media title. For example, developing a storyboard for an eleven-minute episode of a television show can take four to six weeks, which means that the episode cannot be produced for at least four to six weeks after the initial script has been written. Further, because only a limited number of storyboard artists exist, increasing the number of people assigned to develop the storyboard for a given media title in order to speed up production is usually not feasible.

As the foregoing illustrates, what is needed in the art are more effective techniques for generating storyboards.

SUMMARY

One embodiment of the present invention sets forth a computer-implemented method for generating a storyboard. The method includes determining a first categorization of a first portion of a media title; determining a first media item based on at least one of the first categorization or a first caption associated with the first portion of the media title; modifying the first media item based on at least one of the first categorization or a character associated with the first caption to generate a second media item; and generating a sequence of media items for the storyboard that includes the second media item.

At least one technical advantage of the disclosed techniques relative to the prior art is that, with the disclosed techniques, a storyboard is automatically generated based on natural-language descriptions of different shots. In particular, pre-existing media content is identified and re-purposed (for later phases of iterative storyboarding on the same production or new stories involving characters from previous productions) or new media content is generated for the storyboard based on natural-language captions that can be specified via any number of written phrases, spoken phrases, or gestures. As a result, both the manual effort and time required to generate a storyboard can be reduced relative to prior art techniques. Further, because the disclosed techniques do not rely on the artistic skill of users, the disclosed techniques enable a wide range of users to develop effective storyboards, which helps to further reduce the product delays oftentimes experienced using prior art techniques. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

System Overview

Figure 1:
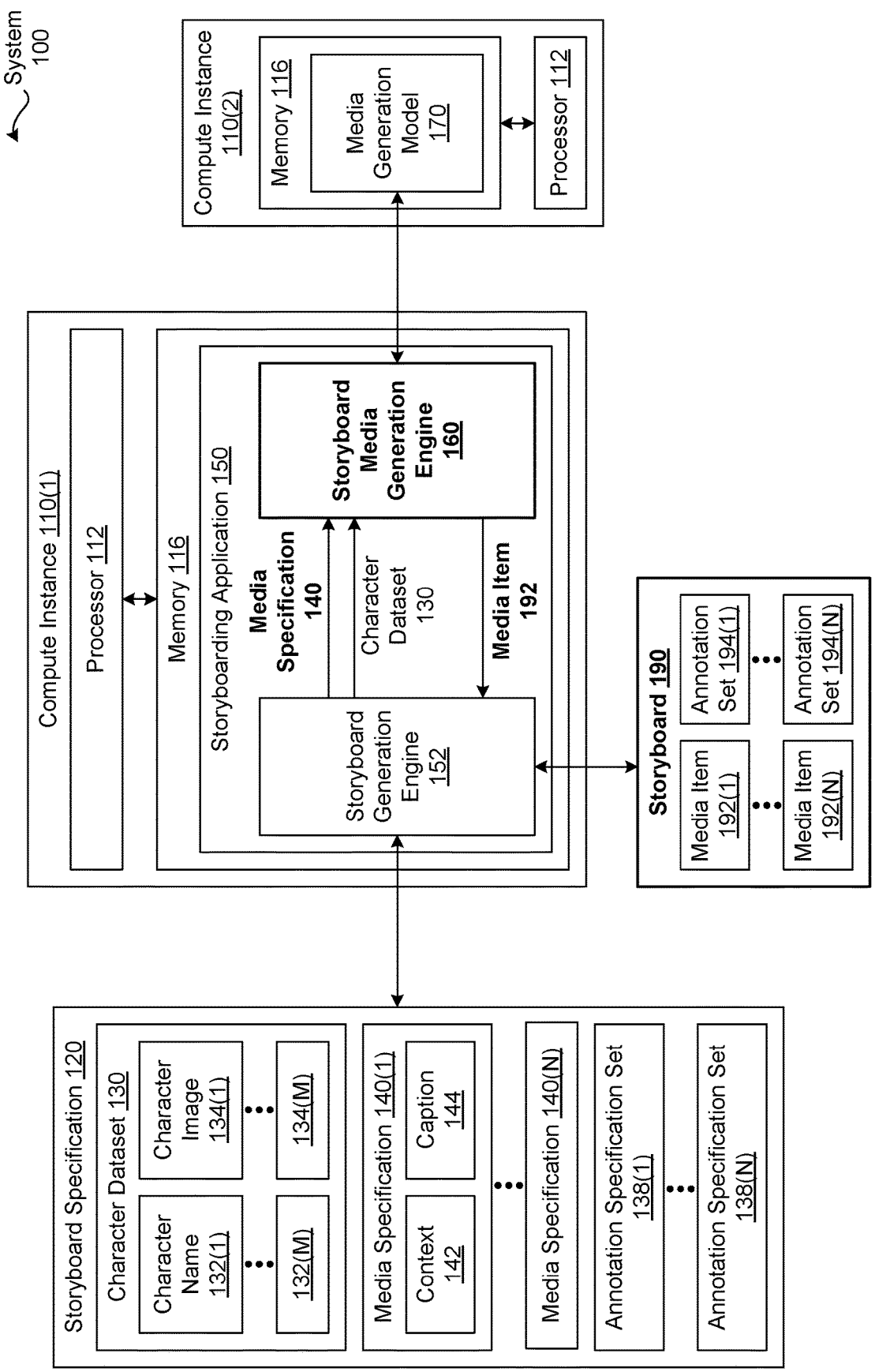
FIG. 1 is a conceptual illustration of a system configured to implement one or more aspects of the various embodiments.

FIG. 1 is a conceptual illustration of a system 100 configured to implement one or more aspects of the various embodiments. As shown, the system 100 includes, without limitation, compute instances 110(1), 110(2) (hereinafter "compute instances 110"), a storyboard 190, and a storyboard specification 120. For explanatory purposes, multiple instances of like objects are denoted with reference numbers identifying the object and parenthetical alphanumeric character(s) identifying the instance where needed.

Any number of the components of the system 100 may be distributed across multiple geographic locations or implemented in one or more cloud computing environments (i.e., encapsulated shared resources, software, data, etc.) in any combination. Each of the compute instances 110 may be implemented in a cloud computing environment, implemented as part of any other distributed computing environment, or implemented in a stand-alone fashion.

As shown, each of the compute instances 110 includes, without limitation, a processor 112 and a memory 116. The processor 112 may be any instruction execution system, apparatus, or device capable of executing instructions. For example, the processor 112 could comprise a central processing unit, a graphics processing unit, a controller, a micro-controller, a state machine, or any combination thereof. The memory 116 of a given compute instance 110 stores content, such as software applications and data, for use by the processor 112 of the given compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory, read only memory, floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory, an optical storage device, a magnetic storage device, or any suitable combination of the foregoing.

In general, each of the compute instances 110 is configured to implement one or more applications or subsystems of applications. For explanatory purposes only, each application is described as residing in the memory 116 of a single compute instance 110 and executing on the processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instances 110 are configured to generate a storyboard 190 for a media title (not shown). A media title includes, without limitation, any amount and type of audio content, any amount and type of video content, and any amount and type of images, in any combination. For instance, the media title may be a feature-length film, an episode of a television program, an audio file, a video file, media content for a computer or video game, media content for a virtual-reality experience, media content for an augmented-reality experience, or the like. Furthermore, the media title may include any amount (including none) of hand-drawn or computer-animated media content, any amount (including none) or live-action media content, any number (including none) of hand-drawn or computer-animated images, and any number (including none) of live-action images in any combination.

As shown, the storyboard 190 includes, without limitation, media items 192(1)-192(N) (hereinafter "media items 192") and annotation sets 194(1)-194(N) (hereinafter "annotation sets 194"), where N may be any integer. Each of the media items 192 may be an image or a media sequence that includes, without limitation, a set of frames of video content and/or audio content that is intended to run for an uninterrupted period of time. In general, each media item 192 represents one or more shots. As referred to herein, a "shot" is a set of frames that is captured continuously from a single camera or virtual representation of a camera (e.g., for a computer-animated media title).

The annotation sets 194(1)-194(N) are associated with the media items 192(1)-192(N), respectively. Each of the annotation sets 194 may include, without limitation, any amount and type of information that conveys a vision for the associated media item 192. Some examples of information that may be included in the annotation sets 194 include, without limitation, actions performed by characters with or without props during the shot(s), camera angles for capturing the shot(s), lighting for the shot(s), dialog that is spoken during the shot(s), sound effects that are heard during the shot(s), and music played during the shot(s), to name a few.

If each of the media items 192 is an image, then displaying the storyboard 190 typically refers to displaying each of the media items 192 along with the associated annotation set 194 on a 2D surface in a predetermined arrangement. For instance, in some embodiments, groups of sequential media items 192 and the associated annotation sets 194 are assigned to different panels, each panel is printed on a separate poster board, and then the poster boards are arranged into a display board. By contrast, if each of the media items 192 is a media sequence, then displaying the storyboard 190 typically refers to playing back each of the media items 192, optionally superimposed with any amount of information included in the associated annotation set 194, in a predetermined playback order.

As described in detail previously herein, in a conventional storyboard generation process, a group of storyboard artists generates images for an initial storyboard for a media title either manually or via digital sketching software. Subsequently, the group of storyboard artists iteratively refines the initial storyboard as part of a collaborative effort with writers to properly capture the vision and style of the filmmakers or others who responsible for producing the finished media title.

One drawback of the above conventional storyboard generation process is that generating and updating each image usually requires a significant amount of manual effort. Consequently, the total amount of time required to develop the storyboard can substantially delay the production of the media title. Further, because only a limited number of people have the level of artistic talent necessary to generate effective images for storyboards, increasing the number of people assigned to develop the storyboard in order to speed up production of the media title is usually not feasible.

Automatically Generating Storyboards

To reduce the manual effort, overall time, and artistic skill required to generate effective storyboards 190, the system 100 includes, without limitation, a storyboarding application 150 and a media generation model 170. As shown, the storyboarding application 150 resides in the memory 116 of the compute instance 110(1) and executes on the processor 112 of the compute instance 110(1), and the media generation model 170 resides in the memory 116 of the compute instance 110(2) and executes on the processor 112 of the compute instance 110(2).

In some alternate embodiments, the functionality of the storyboarding application 150 and the media generation model 170 may be distributed across any number of applications and/or subsystems that execute on any number of compute instances 110 in any combination. In the same or other alternate embodiments, any amount of the functionality of the storyboarding application 150 and any amount of the functionality of the media generation model 170 may be consolidated into one application or subsystem that executes on any number of compute instances 110 (including one).

As shown, the storyboarding application 150 generates the storyboard 190 based on the storyboard specification 120. The storyboard specification 120 includes, without limitation, a character dataset 130, media specifications 140(1)-140(N) (hereinafter "media specifications 140"), and annotation specification sets 138(1)-138(N) (hereinafter "annotation specification sets 138"). The character dataset 130 includes, without limitation, character names 132(1)-132(M) (hereinafter "character names 132") and character images 134(1)-134(M) (hereinafter "character images 134"), where M is any positive integer. Each of the character names 132(1)-132(M) specifies an identifying name for a different character (e.g., a live action character, a computer-animated character, etc.) that appears in the media title. The character images 134(1)-134(M) specify images for the characters identified by the character names 132(1)-132(M), respectively. In alternate embodiments, each of the character images 134 may be replaced or supplemented with any amount and type of information that enables a character to be represented in the media items 192. For instance, in some embodiments, each of the character images 134 may be replaced with a rigged character model that facilitates animation of the associated character.

The media specifications 140(1)-140(N) describe the portions of the media title that the media items 192(1)-192(N), respectively, are to represent. As shown, each of the media specifications 140 includes, without limitation, a context 142 and a caption 144. The context 142 is a text-based description that characterizes the associated portion of the media title. For instance, in some embodiments, the context 142 may specify any number of a genre, a mood, and a theme. The caption 144 is any number of words that describe action(s) that occur during the associated portion of the media title and, optionally, any number of associated subjects, objects, settings, etc.

In alternate embodiments, each of the media specifications 140 may describe the associated portion of the media title in any technically feasible fashion. In the same or other alternate embodiments, a global specification may describe the media title in any technically feasible fashion. For instance, in some embodiments, any number of contexts 142 may be replaced or supplemented with a global context that characterizes the media title.

The annotation specification sets 138(1)-138(N) specify the annotation information that the annotation sets 194(1)-194(N), respectively, are to represent. Each of the annotation specification sets 138 may specify any amount and type of information that conveys a vision for the associated media item 192 in any technically feasible fashion.

As shown, the storyboarding application 150 includes, without limitation, a storyboard generation engine 152 and a storyboard media generation engine 160. The storyboard generation engine 152 interfaces with user(s) and/or software application(s) to generate and modify the storyboard specification 120. As the storyboard generation engine 152 generates and modifies the storyboard specification 120, the storyboard generation engine 152 also generates and/or modifies the storyboard 190 based on the storyboard specification 120. The storyboard generation engine 152 may provide any number and type of mechanisms that enable users and/or software applications to generate and modify the storyboard specification 120 and view the storyboard 190.

For instance, in some embodiments, the storyboard generation engine 152 provides a workflow framework. The workflow framework includes, without limitation, a graphical user interface ("GUI") that enables the users to generate and modify script elements and media options that are displayed in a visual and temporal fashion. Examples of script elements include, without limitation, characters, locations, dialogs, transitions, actions, etc. Examples of media options include, without limitation, camera-shot options, camera angles, lighting options, and so forth.

As the workflow framework modifies script elements based on user input, the storyboard generation engine 152 automatically updates the storyboard specification 120 and re-generates the storyboard 190. The storyboard generation engine 152 may re-generate the storyboard 190 in any technically feasible fashion. For instance, in some embodiments, the storyboard generation engine 152 re-generates the entire storyboard 190. In other embodiments, the storyboard generation engine 152 deletes, re-generates, and/or generates only the portion(s) of the storyboard 190 corresponding to deletions from, modifications to, and/or additions to, respectively, the storyboard specification 120.

The storyboard generation engine 152 may receive any type of user input in any technically feasible fashion from any number and type of input devices and/or input/output devices and then process the user input using any number and type of techniques. For instance, in some embodiments, the storyboard generation engine 152 may receive text-based input via a keyboard and graphical input via a mouse.

In the same or other embodiments, the storyboard generation engine 152 may receive verbal commands uttered by users via any type of microphone or microphone array. The storyboard generation engine 152 may implement any number of speech recognition, natural language understanding, and intent recognition techniques, in any combination, to process the verbal commands. Examples of natural language understanding and intent recognition techniques may include, without limitation, keyword matching, intent recognition models, part-of-speech tagging to generate inputs for intent recognition models, entity extraction and identification to recognize what words are referring to characters, etc.

In the same or other embodiments, the storyboard generation engine 152 may implement any number and type of virtual reality, augmented reality, virtual positioning system, and motion capture techniques in any combination to enable motion-based user input. Notably, in some embodiments, the captions 144 may be specified via any number and combination of written phrases, spoken phrases, or gestures in any combination.

The storyboard generation engine 152 generates or re-generates the annotation sets 194 based on the annotation specification sets 138. The storyboard generation engine 152 may generate or re-generate the annotation sets 194 in any technically feasible fashion. The storyboard generation engine 152 configures the storyboard media generation engine 160 to generate or re-generate the media items 192 based on media specifications 140. More precisely, to generate a new media item 192 or re-generate an existing media item 192, the storyboard generation engine 152 transmits the associated media specification 140 and the character dataset 130 to the storyboard media generation engine 160. For explanatory purposes only, after the storyboard generation engine 152 adds or changes one of the media specifications 140, the associated media item 192 is referred to herein as "out of sync" with the media specification 140 until the storyboard media generation engine 160 generates or re-generates the media item 192 as per the media specification 140.

Figure 2:
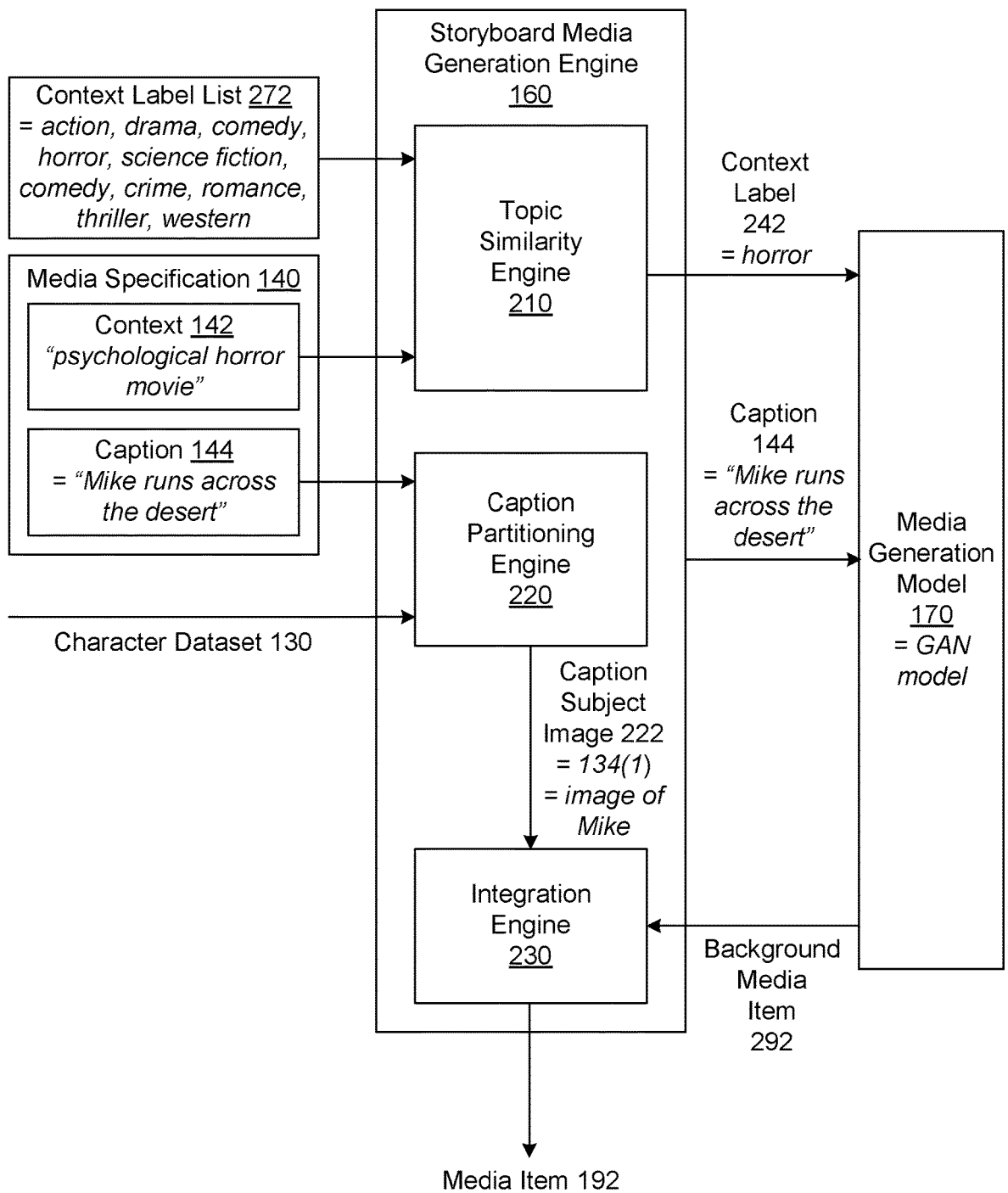
FIG. 2 is a more detailed illustration of the storyboard media generation engine of FIG. 1, according to various embodiments.

As described in greater detail in conjunction with FIG. 2, the storyboard media generation engine 160 configures the media generation model 170 to generate a background media item (not shown in FIG. 1) based on the media specification 140. The media generation model 170 may be any type of software application that performs any amount and type of operations to identify and/or generate a media item. For instance, in some embodiments, the media generation model 170 is a generative adversarial network ("GAN") model that is trained to synthesize a new image or a new media sequence based on input data derived from the media specification 140. In some other embodiments, the media generation model 170 is an image-text caption model that cuts and combines existing classified images and/or existing classified media sequences based on input data derived from the media specification 140 to generate a new media image or a new media sequence. The background media item is an image or a media sequence that represents a background described by the media specification 140. For example, a background media item could be an image of a beach.

In some alternate embodiments, the functionality of the media generation model 170 may be subsumed into the storyboard media generation engine 160, and the media generation model 170 and the compute instance 110(2) may be omitted from the system 100. In other embodiments, the system 100 may include any number and type of media generation models 170 and the storyboard media generation engine 160 may select one of the media generation models 170 based on the media specification 140. For example, each of the media generation models 170 could be a machine learning model that is trained to generate images associated with a different genre, and the storyboard media generation engine 160 could select the media generation model 170 that is associated with a genre specified via the context 142 included in the media specification 140.

After the storyboard media generation engine 160 generates the background media item, the storyboard media generation engine 160 overlays the character image 134 associated with the caption 144 onto the background media item. In alternate embodiments, the storyboard media generation engine 160 may perform any number (including zero) and type of post-processing operations, such as graphics processing operations, on the background media item to generate the media item 192. The media item 192 is an image or a media sequence that holistically reflects the media specification 140. In some embodiments, the media item 192 includes, without limitation, a foreground derived from one of the character images 134 and a background generated by the media generation model 170.

Note that the techniques described herein are illustrative rather than restrictive and may be altered without departing from the broader spirit and scope of the invention. Many modifications and variations on the functionality provided by the storyboarding application 150, the storyboard generation engine 152, the storyboard media generation engine 160, and the media generation model 170 will be apparent to those of ordinary skill in the art without departing from the scope and spirit of the described embodiments.

For instance, in some alternate embodiments, any number of the storyboarding application 150, the storyboard generation engine 152, and the storyboard media generation engine 160 may be integrated into a real-time game engine and the techniques described herein are modified accordingly. For instance, in some alternate embodiments, the game engine may provide media sequences generated via motion capture instead of or in addition to the character images 134 and/or the captions 144. In the same or other embodiments, the storyboard generation engine 152 may receive an initialization media sequence from the game engine. The storyboard generation engine 152 may identify moments of movement and/or greatest change in the initialization media sequence to generate an initial storyboard 190 that includes, without limitation, a sequence of images. Subsequently, the initial storyboard 190 can be modified via a storyboard specification 120. In some alternate embodiments the game engine may enable quick camera shifts around a three-dimensional object or person, and the storyboard generation engine 152 may modify and/or augment the storyboard specification 120 based on associated camera angle information.

In various alternate embodiments, the storyboard generation engine 152 may implement approval mechanism(s) for the storyboard 190. For instance, in some alternate embodiments, after the storyboard media generation engine 160 generates or re-generates one of the media items 192, the storyboard generation engine 152 may display the media item 192 and the associated caption 144 for the approval/disapproval of a user. If the user indicates disapproval, then the storyboard generation engine 152 may configure the storyboard media generation engine 160 to re-generate the media item 192. As part of configuring the storyboard media generation engine 160 to re-generate the media item 192, the storyboard generation engine 152 may specify any number of constraints to ensure that the storyboard media generation engine 160 does not generate the same or a similar media item 192. Alternatively, the storyboard generation engine 152 may allow the user to specify an acceptable media item 192.

It will be appreciated that the system 100 shown herein is illustrative and that variations and modifications are possible. For example, the functionality provided by the storyboarding application 150, the storyboard generation engine 152, the storyboard media generation engine 160, and the media generation model 170 as described herein may be integrated into or distributed across any number of software applications (including one), and any number of components of the system 100. Further, the connection topology between the various units in FIG. 1 may be modified as desired.

Generating Media Items for the Storyboard

FIG. 2 is a more detailed illustration of the storyboard media generation engine 160 of FIG. 1, according to various embodiments. As described previously herein in conjunction with FIG. 1, upon receiving the media specification 140, the storyboard media generation engine 160 generates the media item 192 that reflects the media specification 140. For explanatory purposes only, exemplary values are depicted in italics for some of the components shown in FIG. 2. For example, the media specification 140 includes, without limitation, the context 142 having an exemplary value of "psychological horror movie" and the caption 144 having an exemplary value of "Mike runs across the desert."

As shown, the storyboard media generation engine 160 includes, without limitation, a topic similarity engine 210, a caption partitioning engine 220, and an integration engine 230. The topic similarity engine 210 determines a context label 242 from a context label list 272 based on the context 142 included in the media specification 140. The context label list 272 includes without limitation, any number of labels, where each label is a different available input value for the same input of the media generation model 170. Each label included in the context label list 272 corresponds to a different category of media content, and each category can specify any number of genres, themes, moods, styles, etc. in any combination. The context label 242 is also referred to herein as a "categorization" of the portion of the media title that is associated with the media specification 140.

For example, each of the labels included in the context label list 272 could correspond to a different genre, and the context label list 272 could include, without limitation, the exemplary labels of action, drama, comedy, horror, science fiction, comedy, crime, romance, thriller, and western. In another example, each of the labels included in the context label list 272 could correspond to a different theme or archetype, such as revenge, good-versus-evil, triumph over adversity, and so forth.

The topic similarity engine 210 implements any number and type of text-based similarity techniques to identify the label included in the context label list 272 that is most similar to the context 142. The topic similarity engine 210 then sets the context label 242 equal to the identified label. For example, the topic similarity engine 210 could identify that the label "horror" is the label included in the context label list 272 that is the most similar to the context 142 of "psychological horror movie." The topic similarity engine 210 would then set the context label 242 equal to "horror."

In alternate embodiments, the topic similarity engine 210 may determine any number of context labels 242 based on any number of contexts 142 and any number of context label lists 272 in any technically feasible fashion. For instance, in some alternate embodiments, the topic similarity engine 210 may use any number and type of image classifiers and/or media sequence classifiers for genre, theme, mood, style, etc., in any combination to determine any number of context labels 242. In the same or other embodiments, the topic similarity engine 210 may use any number and type of recommendation systems for genre, theme, mood, style, etc., in any combination to determine any number of context labels 242. The recommendation systems may implement collaborative filtering, content-based filtering, knowledge-based techniques, and the like, in any combination and based on any amount and type of information derived from the media specification 140.

As shown, the caption partitioning engine 220 determines a caption subject image 222 based on the caption 144 and the character dataset 130. In operation, the caption partitioning engine 220 identifies one of the character names 132 from the caption 144. For example, the caption partitioning engine 220 could identify the character name 132(1) of "Mike" from the caption 144 of "Mike runs across the desert." The caption partitioning engine 220 then sets the caption subject image 222 equal to the character image 134 associated with the identified character name 132.

The caption partitioning engine 220 may identify the character name 132 from the caption 144 in any technically feasible fashion. For instance, in some embodiments, the caption partitioning engine 220 implements any number and type of natural language processing ("NLP") operations to extract one of the character names 132 from the caption 144. In the same or other embodiments, if the caption 144 does not include any of the character names 132, then the caption partitioning engine 220 sets the caption subject image 222 equal to a value (e.g., NULL) that indicates that an associated image is not available.

In alternate embodiments, the caption partitioning engine 220 may determine any amount (including none) and type of information based on the caption 144 instead of or in addition to the caption subject image 222. For instance, in some alternate embodiments, the caption partitioning engine 220 determines a setting label (not shown) based on the caption 144. The caption partitioning engine 220 may determine the setting label and/or any number of other labels based on the caption 144 in any technically feasible fashion. For instance, in some embodiments, the caption partitioning engine 220 may use a label extraction NLP application to extract named entities (e.g., the character names 132), settings, objects, etc., from the caption 144.

As shown, the storyboard media generation engine 160 outputs the context label 242 and the caption 144 to the media generation model 170 and, in response to the received inputs, the media generation model 170 outputs a background media item 292 that reflects both the context label 242 and the caption 144. The media generation model 170 may be any type of software application or subsystem that implements any number and type of operations to determine the background media item 292 based on the context label 242 and the caption 144. For instance, in some embodiments, the media generation model 170 is a GAN model that is trained to synthesize a new image or a new media sequence based on the context label 242 and the caption 144. In other embodiments, the media generation model 170 is an image-text caption model that cuts and combines existing classified images and/or existing classified media sequences based on the context label 242 and the caption 144 to generate a new media image or a new media sequence.

In alternate embodiments, the media generation model 170 may generate the background media item 292 based on any amount and type of input data derived from the media specification 140 in any technically feasible fashion, and the techniques described herein are modified accordingly. For instance, in some alternate embodiments, the caption partitioning engine 220 determines a setting label from a setting label list. The setting label list is associated with a media database of labeled images and/or labeled media sequences.

Subsequently, the storyboard media generation engine 160 outputs the setting label to the media generation model 170 and, in response, the media generation model 170 identifies one of the labeled images or the labeled media sequences in the media database that matches the setting label. The media generation model 170 then performs any number (including zero) of verification operations based on the context label 242 to determine whether the identified image or media sequence is acceptable. For instance, in some embodiments, the media generation model 170 is a GAN model architecture in which verification operations are based on an estimated or a predicted loss from the Discriminator model of the GAN architecture that determines whether a generated image is realistic. If the identified image or media sequence is acceptable, then the media generation model 170 sets the background media item 292 equal to the identified image or media sequence. Otherwise, the media generation model 170 identifies a different labeled image or different labeled media sequence or generates a different image or media sequence that matches the setting label.

As shown, the integration engine 230 generates the media item 192 based on the caption subject image 222 and the background media item 292. More precisely, the integration engine 230 overlays the caption subject image 222 onto the background media item 292 to generate a new media item 192 that reflects the caption subject image 222, the context label 242, and the caption 144. The integration engine 230 may perform any number and type of media processing operations to overlay the caption subject image 222 onto the background media item 292. For instance, in some embodiments, the integration engine 230 may use a rule-based horizon/proportion or a data-driven machine learning model to size the caption subject image 222. In some alternate embodiments, the media generation model 170 and/or the integration engine 230 may use a scene segmentation model (not shown) to identify and separate foreground characters from images and/or media sequences.

As a general matter, the storyboard media generation engine 160 may implement any number and type of techniques to automatically identify and/or generate media items 192 for storyboards 190 based on any amount and type of relevant data. For instance, in some alternate embodiments, the media generation model 170, the caption partitioning engine 220, or a character generation model may generate and/or modify the caption subject image 222. In the same or other embodiments, the media generation model 170 generates the media item 192 or a different wholistic media item that includes, without limitation, background and foreground, based on the media specification 140. The media generation model 170 may generate a wholistic media item in any technically feasible fashion. In some alternate embodiments, the media generation model 170 generates a wholistic image using an encoder and a Convolutional Recurrent Neural Network. In other alternate embodiments, the media generation model 170 generates a wholistic image using a conditional GAN-based image and language multi-modal neural model. In some alternate embodiments, any number of the topic similarity engine 210, the caption partitioning engine 220 and/or the integration engine 230 may be omitted from the storyboard media generation engine 160.

In some alternate embodiments, the storyboard media generation engine 160 may receive one or more input drawings or input images that illustrate a particular animated hand-drawn style. The media generation model 170 and/or the integration engine 230 may use a neural style transfer model or a trained machine-learning image translation model to convert media content (i.e., images or frames of media sequences) into the animated hand-drawn style.

In some alternate embodiments, the media generation model 170 and/or the integration engine 230 may receive any number of target camera angles and/or any number of lighting parameters and may perform any type of media processing operations based on the target camera angles and/or lighting parameters. For example, the integration engine 230 could include, without limitation, any number of plugin type adapters to send messages to a game engine that cause the game engine to change the camera angle and re-generate a view. In another example, the integration engine 230 could use a GAN-based neural model (e.g., a relighting model) or implement neural volumetric rendering techniques to re-create new lighting angles or new views.

Figure 3:
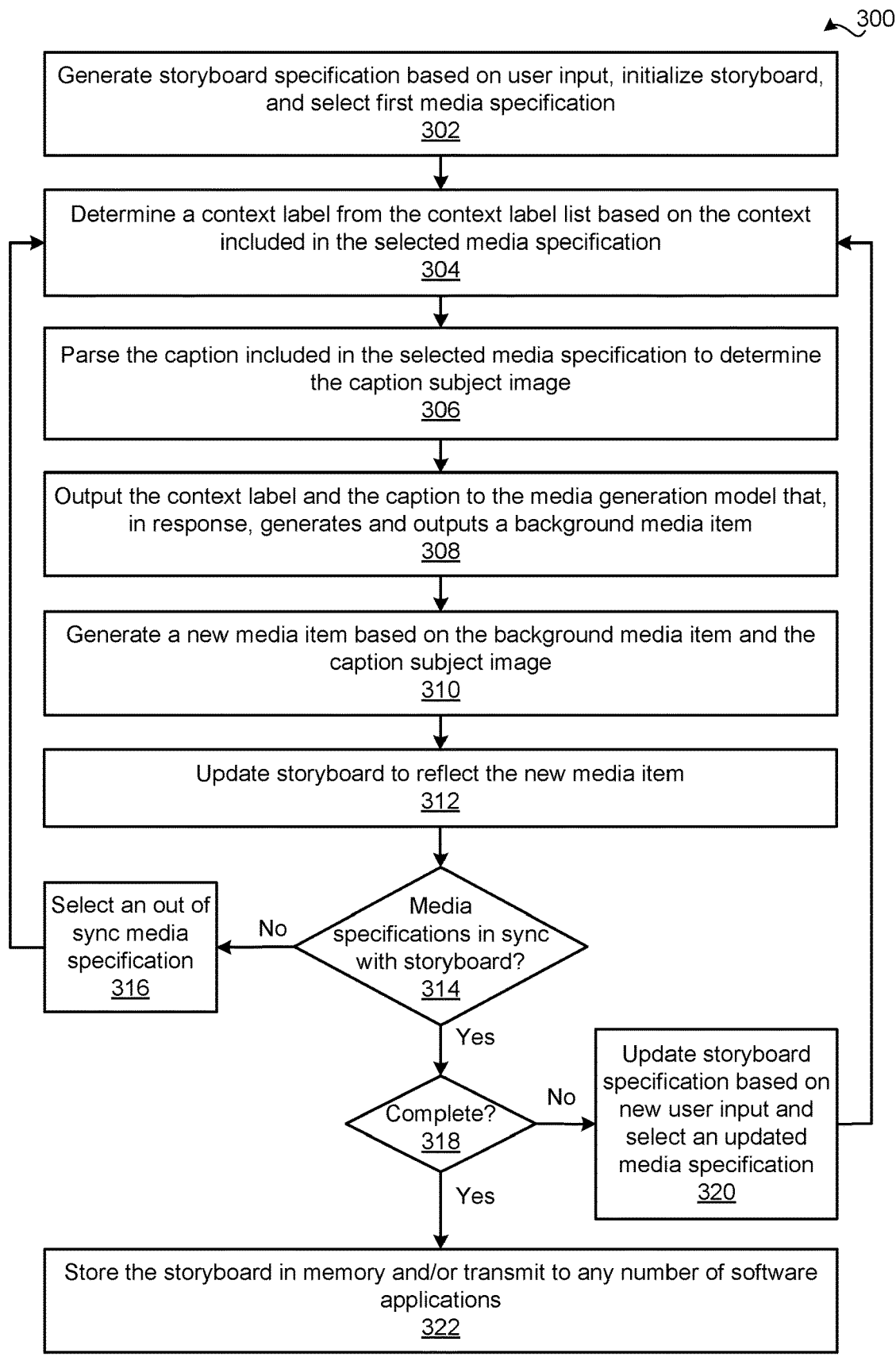
FIG. 3 is a flow diagram of method steps for generating a storyboard, according to various embodiments.

FIG. 3 is a flow diagram of method steps for generating a storyboard, according to various embodiments. Although the method steps are described with reference to the systems of FIGS. 1-2, persons skilled in the art will understand that any system configured to implement the method steps, in any order, falls within the scope of the present invention.

As shown, a method 300 begins at step 302, where the storyboard generation engine 152 generates the storyboard specification 120 based on user input, initializes the storyboard 190, and selects one of the media specifications 140 included in the storyboard specification 120. At step 304, the topic similarity engine 210 determines the context label 242 from the context label list 272 based on the context 142 included in the selected media specification 140. At step 306, the caption partitioning engine 220 parses the caption 144 included in the selected media specification 140 to determine the caption subject image 222.

At step 308, the storyboard media generation engine 160 outputs the context label 242 and the caption 144 to the media generation model 170. In response to receiving the context label 242 and the caption 144, the media generation model 170 generates and outputs the background media item 292. At step 310, the integration engine 230 generates a new media item 192 based on the background media item 292 and the caption subject image 222.

At step 312, the storyboard generation engine 152 updates the storyboard 190 to reflect the new media item 192. At step 314, the storyboard generation engine 152 determines whether the media specifications 140 included in the storyboard specification 120 are in sync the storyboard 190. If, at step 314, the storyboard generation engine 152 determines that any of the media specifications 140 are out of sync with the storyboard 190, then the method 300 proceeds to step 316. At step 316, the storyboard generation engine 152 selects an out of sync media specification 140. The method 300 then returns to step 304, where the storyboard media generation engine 160 processes the selected media specification 140 (La, the selected out of sync media specification).

If, however, at step 314, the storyboard generation engine 152 determines that all of the media specifications 140 are in sync with the storyboard 190, then the method 300 proceeds directly to step 318. At step 318, the storyboard generation engine 152 determines whether the development of the current version of the storyboard 190 is complete. The storyboard generation engine 152 may determine whether the development of the current version of the storyboard 190 is complete in any technically feasible fashion. For instance, in some embodiments, the storyboard generation engine 152 determines that the development of the current version of the storyboard 190 is complete when the storyboard generation engine 152 receives an exit command from a user.

If, at step 318, the storyboard generation engine 152 determines that the development of the current version of the storyboard 190 is not complete, then the method 300 proceeds to step 320. At step 320, the storyboard generation engine 152 updates the storyboard specification 120 based on user input and selects an updated media specification 140. The method 300 then returns to step 304, where the storyboard media generation engine 160 processes the selected media specification 140 (i.e., the selected updated media specification).

If, however, at step 318, the storyboard generation engine 152 determines that the development of the current version of the storyboard 190 is complete, then the method 300 proceeds directly to step 322. At step 322, the storyboard generation engine 152 stores the storyboard 190 in a specified memory location and/or transmits the storyboard 190 to any number of software applications. The method 300 then terminates.

In sum, the disclosed techniques enable efficient generation of storyboards for media titles. In some embodiments, a storyboarding application includes, without limitation, a storyboard generation engine and a storyboard media generation engine. The storyboard generation engine interacts with users to generate and update a storyboard specification that describes a storyboard. The storyboard specification includes, without limitation, a character dataset, N media specifications, and N annotation specification sets, where N is any positive integer and may vary over time. Each media specification includes, without limitation, a text-based context and a text-based caption. As the storyboard generation engine updates the storyboard specification, the storyboard generation engine ensures that the storyboard includes, without limitation, a different media item for each media specification and a different annotation set for each annotation specification set.

In particular, when the storyboard generation engine adds or modifies a media specification, the storyboard generation engine transmits the media specification and the character dataset to the storyboard media generation engine. The storyboard media generation engine includes, without limitation, a topic similarity engine, a caption partitioning engine, and an integration engine. The topic similarity engine implements any number of text-based similarity algorithms and/or any number of classification algorithms to determine the context label associated with a GAN model that best matches the context included the media specification. The caption partitioning engine identifies a character name from the caption included in the media specification. The caption partitioning engine then determines a caption subject image that corresponds to the identified character name based on the character dataset.

Subsequently, the storyboard media generation engine outputs the context label and the caption to the GAN model. In response, the GAN model generates a background media item. The integration engine performs any number and type of image processing operations to overlay the caption subject image onto the background media item to generate a media item that reflects the media specification. The storyboard media generation engine then transmits the media item to the storyboard generation engine for integration into the storyboard.

At least one technical advantage of the disclosed techniques relative to the prior art is that the storyboarding application automatically generates media items for a storyboard based on natural-language descriptions of different groups of shots. In particular, the storyboarding application identifies and re-purposes pre-existing media items or generates new media items based on natural-language captions that can be specified via any number of written phrases, spoken phrases, or gestures. As a result, the storyboarding application can reduce both the manual effort and time required to initially generate a storyboard as well as the manual effort and time required to update the storyboard relative to prior art techniques. Further, because the storyboarding application does not require users to sketch images, the storyboarding application enables a wider range of users to develop effective storyboards relative to prior art techniques. Consequently, the storyboard application can help to further reduce the product delays oftentimes experienced using prior art techniques that rely on the artistic abilities of users to generate effective storyboards. These technical advantages provide one or more technological advancements over prior art approaches.

1. In some embodiments, a computer-implemented method for generating a storyboard comprises determining a first categorization of a first portion of a media title, determining a first media item based on at least one of the first categorization or a first caption associated with the first portion of the media title, modifying the first media item based on at least one of the first categorization or a character associated with the first caption to generate a second media item, and generating a sequence of media items for the storyboard that includes the second media item.

2. The computer-implemented method of clause 1, wherein the first media item comprises an image, a set of frames of video content, or a set of frames of audio content.

3. The computer-implemented method of clauses 1 or 2, wherein determining the first media item comprises inputting the at least one of the first categorization or the first caption into a generative adversarial network model to generate the first media item.

4. The computer-implemented method of any of clauses 1-3, wherein determining the first media item comprises inputting the first categorization and the first caption into an image-text caption model that combines different portions of at least two media items to generate the first media item.

5. The computer-implemented method of any of clauses 1-4, wherein modifying the first media item comprises determining a character image based on the character, and performing one or more graphics processing operations to overlay the character image onto the first media item to generate the second media item.

6. The computer-implemented method of any of clauses 1-5, wherein modifying the first media item comprises inputting the first media item and at least one image associated with the first categorization into a neural style transfer model or a trained machine-learning image translation model to convert the first media item to a stylized media item, and performing one or more graphics processing operations on the stylized media item based on at least one camera angle or lighting parameter to generate the second media item.

7. The computer-implemented method of any of clauses 1-6, wherein the first categorization specifies at least one of a genre, a theme, a mood, or a style.

8. The computer-implemented method of any of clauses 1-7, wherein the first caption is generated based on at least one of a written phrase, a spoken phrase, or a gesture.

9. The computer-implemented method of any of clauses 1-8, further comprising transmitting the storyboard to a real-time game engine.

10. The computer-implemented method of any of clauses 1-9, wherein the media title comprises a feature-length film, an episode of a television program, an audio file, a video file, media content for a computer game, media content for a video game, media content for a virtual-reality experience, or media content for an augmented-reality experience.

11. In some embodiments, one or more non-transitory computer readable media include instructions that, when executed by one or more processors, cause the one or more processors to generate a storyboard by performing the steps of determining a first categorization of a first portion of a media title, determining a first media item based on at least one of the first categorization or a first caption associated with the first portion of the media title, modifying the first media item based on at least one of the first categorization or a character associated with the first caption to generate a second media item, and generating a sequence of media items for the storyboard that includes the second media item.

12. The one or more non-transitory computer readable media of clause 11, wherein the first media item comprises an image, a set of frames of video content, or a set of frames of audio content.

13. The one or more non-transitory computer readable media of clauses 11 or 12, wherein determining the first media item comprises inputting the at least one of the first categorization or the first caption into a trained machine learning model to generate the first media item.

14. The one or more non-transitory computer readable media of any of clauses 11-13, wherein determining the first media item comprises inputting the first categorization and the first caption into an image-text caption model that combines different portions of at least two media items to generate the first media item.

15. The one or more non-transitory computer readable media of any of clauses 11-14, wherein modifying the first media item comprises determining a character image based on the character, and performing one or more graphics processing operations to overlay the character image onto the first media item to generate a composite media item, and performing one or more graphics processing operations on the composite media item based on at least one camera angle or lighting parameter to generate the second media item.

16. The one or more non-transitory computer readable media of any of clauses 11-15, wherein modifying the first media item comprises inputting the first media item and at least one image associated with the first categorization into a neural style transfer model or a trained machine-learning image translation model to convert the first media item to the second media item.

17. The one or more non-transitory computer readable media of any of clauses 11-16, wherein the first categorization specifies at least one of a genre, a theme, a mood, or a style.

18. The one or more non-transitory computer readable media of any of clauses 11-17, wherein the first caption is generated based on at least one of a written phrase, a spoken phrase, or a gesture.

19. The one or more non-transitory computer readable media of any of clauses 11-18, wherein the character comprises a computer-animated character or a live-action character.

20. In some embodiments, a system comprises one or more memories storing instructions and one or more processors coupled to the one or more memories that, when executing the instructions, perform the steps of determining a first categorization of a first portion of a media title, determining a first media item based on at least one of the first categorization or a first caption associated with the first portion of the media title, modifying the first media item based on at least one of the first categorization or a character associated with the first caption to generate a second media item, and generating a sequence of media items for a storyboard that includes the second media item.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program codec embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a storyboard, the method comprising:
   determining a first categorization of a first portion of a media title;
   generating a first media item based on at least one of the first categorization or a first caption associated with the first portion of the media title;
   modifying the first media item based on at least one of the first categorization or a character associated with the first caption to generate a second media item; and
   generating a sequence of media items for the storyboard that includes the second media item.

2. The computer-implemented method of claim 1, wherein the first media item comprises an image, a set of frames of video content, or a set of frames of audio content.

3. The computer-implemented method of claim 1, wherein generating the first media item comprises inputting the at least one of the first categorization or the first caption into a generative adversarial network model.

4. The computer-implemented method of claim 1, wherein generating the first media item comprises inputting the first categorization and the first caption into an image-text caption model that combines different portions of at least two media items.

5. The computer-implemented method of claim 1, wherein modifying the first media item comprises:
   determining a character image based on the character; and
   performing one or more graphics processing operations to overlay the character image onto the first media item to generate the second media item.

6. The computer-implemented method of claim 1, wherein modifying the first media item comprises:
   inputting the first media item and at least one image associated with the first categorization into a neural style transfer model or a trained machine-learning image translation model to convert the first media item to a stylized media item; and
   performing one or more graphics processing operations on the stylized media item based on at least one camera angle or lighting parameter to generate the second media item.

7. The computer-implemented method of claim 1, wherein the first categorization specifies at least one of a genre, a theme, a mood, or a style.

8. The computer-implemented method of claim 1, wherein the first caption is generated based on at least one of a written phrase, a spoken phrase, or a gesture.

9. The computer-implemented method of claim 1, further comprising transmitting the storyboard to a real-time game engine.

10. The computer-implemented method of claim 1, wherein the media title comprises a feature-length film, an episode of a television program, an audio file, a video file, media content for a computer game, media content for a video game, media content for a virtual-reality experience, or media content for an augmented-reality experience.

11. One or more non-transitory computer readable media including instructions that, when executed by one or more processors, cause the one or more processors to generate a storyboard by performing the steps of:
   determining a first categorization of a first portion of a media title;
   generating a first media item based on at least one of the first categorization or a first caption associated with the first portion of the media title;
   modifying the first media item based on at least one of the first categorization or a character associated with the first caption to generate a second media item; and
   generating a sequence of media items for the storyboard that includes the second media item.

12. The one or more non-transitory computer readable media of claim 11, wherein the first media item comprises an image, a set of frames of video content, or a set of frames of audio content.

13. The one or more non-transitory computer readable media of claim 11, wherein generating the first media item comprises inputting the at least one of the first categorization or the first caption into a trained machine learning model.

14. The one or more non-transitory computer readable media of claim 11, wherein generating the first media item comprises inputting the first categorization and the first caption into an image-text caption model that combines different portions of at least two media items.

15. The one or more non-transitory computer readable media of claim 11, wherein modifying the first media item comprises:
   determining a character image based on the character; and
   performing one or more graphics processing operations to overlay the character image onto the first media item to generate a composite media item; and
   performing one or more graphics processing operations on the composite media item based on at least one camera angle or lighting parameter to generate the second media item.

16. The one or more non-transitory computer readable media of claim 11, wherein modifying the first media item comprises inputting the first media item and at least one image associated with the first categorization into a neural style transfer model or a trained machine-learning image translation model to convert the first media item to the second media item.

17. The one or more non-transitory computer readable media of claim 11, wherein the first categorization specifies at least one of a genre, a theme, a mood, or a style.

18. The one or more non-transitory computer readable media of claim 11, wherein the first caption is generated based on at least one of a written phrase, a spoken phrase, or a gesture.

19. The one or more non-transitory computer readable media of claim 11, wherein the character comprises a computer-animated character or a live-action character.

20. A system comprising:
   one or more memories storing instructions; and
   one or more processors coupled to the one or more memories that, when executing the instructions, perform the steps of:
      determining a first categorization of a first portion of a media title,
      generating a first media item based on at least one of the first categorization or a first caption associated with the first portion of the media title,
      modifying the first media item based on at least one of the first categorization or a character associated with the first caption to generate a second media item, and
      generating a sequence of media items for a storyboard that includes the second media item.

* * * * *